Sept. 6, 1960               K. G. EAKIN             2,952,015

PULSED NOISE SOURCE FOR RECEIVER SENSITIVITY TESTING

Filed June 2, 1959

INVENTOR.
K. G. EAKIN
BY
ATTORNEY
AGENT

United States Patent Office 2,952,015
Patented Sept. 6, 1960

2,952,015

PULSED NOISE SOURCE FOR RECEIVER SENSITIVITY TESTING

Kenneth G. Eakin, Utica, N.Y., assignor to the United States of America as represented by the Secretary of the Air Force Filed June 2, 1959, Ser. No. 817,687

2 Claims. (Cl. 343—17.7)

(Granted under Title 35, U.S. Code (1952), sec. 266)

The invention described herein may be manufactured and used by or for the United States Government for governmental purposes without payment to me of any royalty thereon.

It is well known in the art to measure the ultimate sensitivity of a receiver for the detection of weak signals in the presence of noise generated by the receiver itself by comparing the inherent noise output of the receiver with the receiver output in the presence of a noise input derived from a noise source. The invention is not concerned with the technique and apparatus for actually determing the sensitivity or noise figure of a receiver, but with an arrangement to permit the measurement procedure to be carried out continuously on a radar receiver while it is in operation. Objects of the invention are to provide a device that makes possible the use of standard microwave noise, or signal sources, for the determination of radar system sensitivity while the system is operating; to provide a device which protects the noise source from energy coupled out of the primary transmission line; and to provide a device that makes possible the measurement of noise figure or sensitivity by conventional methods without having to disconnect the antenna and reconnect a noise source for the measurement.

The invention will be described in detail with reference to the specific embodiment thereof shown in the accompanying drawing in which—

Figure 1:
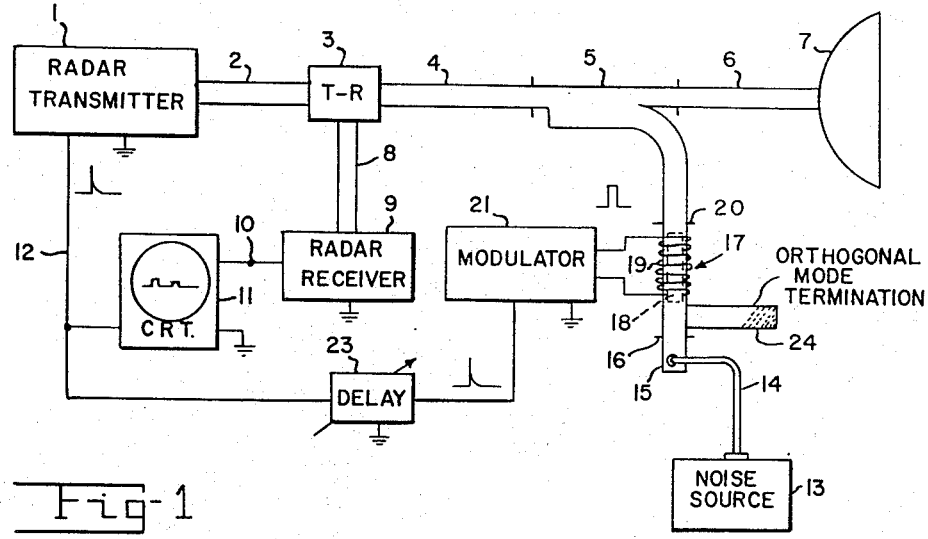
Figure 2:
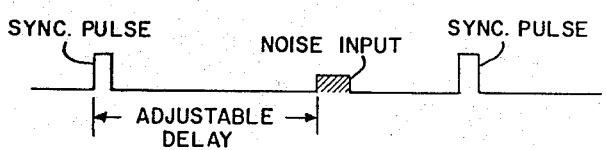

Fig. 1 is a schematic diagram of a radar receiver sensitivity measuring arrangement in accordance with the invention, and Fig. 2 is a graph illustrating the timing of the noise pulse relative to the radiated pulse of the radar system.

Referring to Fig. 1, radar transmitter 1 generates high power pulses of high frequency energy, which pass through waveguide 2, transmit-receive network 3, waveguide 4, directional coupler 5 and waveguide 6 to directional antenna 7. Reflections of the radiated pulses are received by antenna 7 and traverse the above path in the reverse direction as far as transmit-receive network 3, where they are diverted over waveguide 8 to receiver 9. The video output of this receiver is applied over connection 10 to cathode ray tube indicator 11, the sweep of which is synchronized with the transmitted pulses by means of synchronizing circuit 12. The above is all in accordance with conventional radar practice.

As previously stated, in the procedure for measuring the sensitivity of a receiver, a noise input to the receiver is required in order to be able to compare the receiver output due to the inherent noise in the system with the output of the receiver due to inherent noise plus a noise input. The noise input for the receiver in Fig. 1 is derived from noise source 13, which may be any suitable type of noise generator such as one employing a gaseous discharge. The noise output of this source is applied over coaxial line 14 and a suitable coaxial-to-waveguide transition 15 to the input 16 of an isolator 17. The isolator is a waveguide section containing an electric field rotator in the form of a length of microwave ferrite material 18, which may be subjected to a longitudinal magnetic field by the passage of a direct current through coil 19. The isolator is so designed that, with coil 19 deenergized, the electric field at the input 16 is rotated 90° with respect to the electric field at the output 20. Therefore, there is normally no coupling from the input to the output. However, if coil 19 is energized, subjecting the ferrite material to a magentic field, the input wave in passing through this part of the waveguide has its electric field rotated by 90° and therefore passes through the isolator and through directional coupler 5, waveguide section 4 and T–R network 3 to the input of receiver 9.

The current flow in coil 19 is controlled by modulator 21 which may, for example, be a monostable multivibrator which produces one voltage pulse of predetermined duration each time a trigger pulse is applied to it over line 22. The trigger pulse is the synchronizing pulse applied by the transmitter over line 12 delayed by adjustable delay element 23. By means of the adjustable delay the noise input to the receiver may be made to occur at any point between the pulses of high frequency energy produced by the transmitter as shown in Fig. 2.

During the short intervals when the transmitter is supplying high power pulses of high frequency energy to the antenna, coil 19 of the isolator is deenergized. Therefore, at these times, the output 20 is cross polarized with respect to input 16, as already explained, and energy incident upon output 20 from coupler 5 is largely reflected. Any energy from coupler 5 that does pass the ferrite rotator is absorbed by orthogonal mode termination 24, which has the same field direction as output 20 when coil 19 is deenergized. Therefore, isolator 17, the orthogonal mode termination 24 and the attenuation produced by directional coupler 5 all serve to protect noise source 13 from the high transmitter output. The orthogonal mode termination is cross-polarized with respect to input 15 so that it does not absorb any energy from noise source 13.

By the above described apparatus, the output of the receiver in the presence of a noise input can be continuously displayed during operation of the radar system, permitting a continuous indication of the receiver sensitivity. Variable delay 23 permits this output to be placed at a range where no target signals occur.

I claim:

1. In combination with a radar system comprising a transmitter producing periodic pulses of high power high frequency energy, a receiver, an antenna and waveguide means including a transmit-receive network for connecting the output of said transmitter and the input of said receiver to said antenna, means for periodically producing at times intermediate successive transmitter pulses an output from said receiver equal to the inherent noise output plus an output due to a noise input to the receiver, said last means comprising a continuously operating noise source, an isolator in the form of a section of waveguide containing a ferrite field direction rotator having a solenoid for producing a magnetic field in said ferrite and operating when said solenoid is energized to pass electromagnetic wave energy, means coupling said noise source through said isolator to a point between said transmit-receive network and said antenna, and means synchronized with said transmitter pulses for energizing said solenoid for a short interval between successive transmitter pulses.

2. Apparatus as claimed in claim 1 in which means synchronized with said transmitted pulses are provided for indicating the magnitude of the output of said receiver.

No references cited